United States Patent Office 2,780,707
Patented Feb. 5, 1957

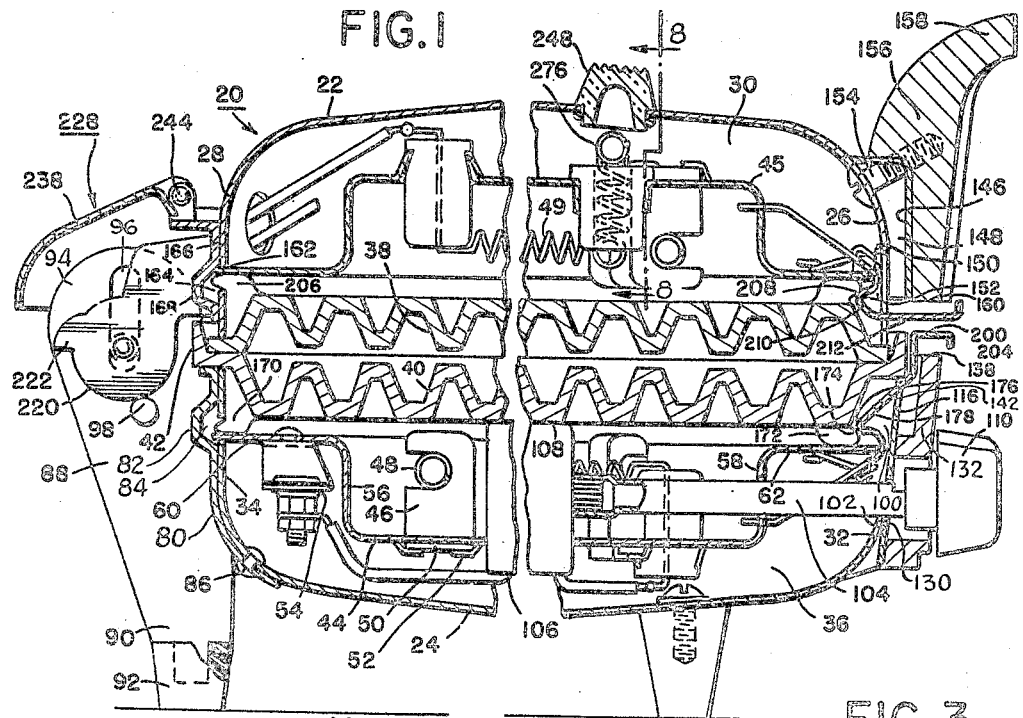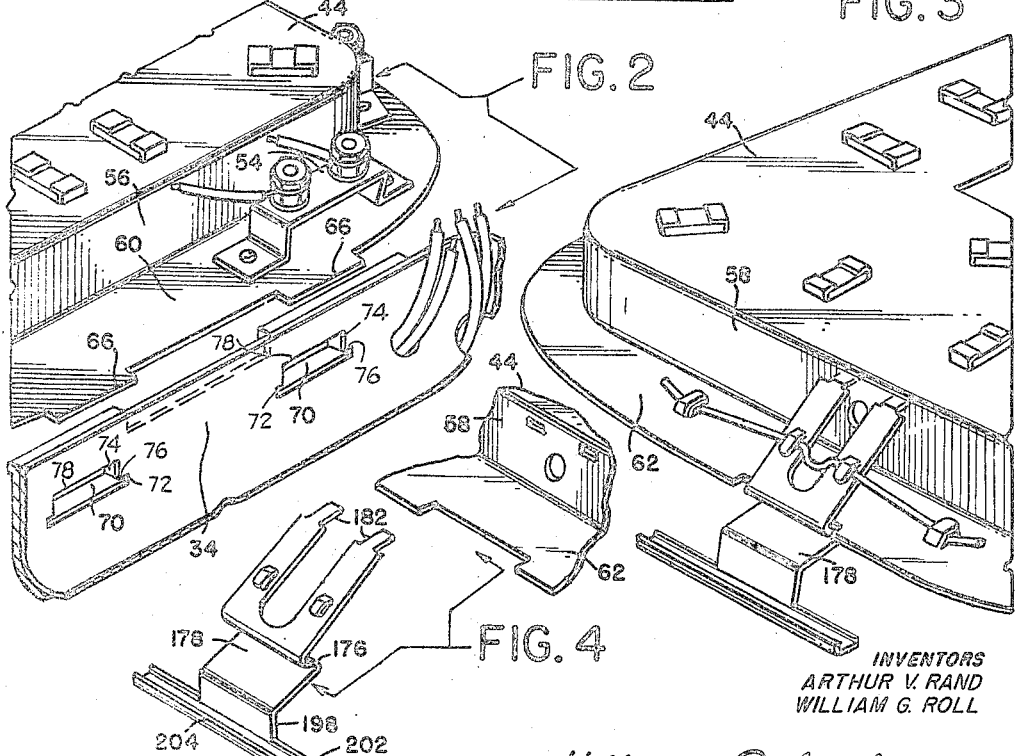

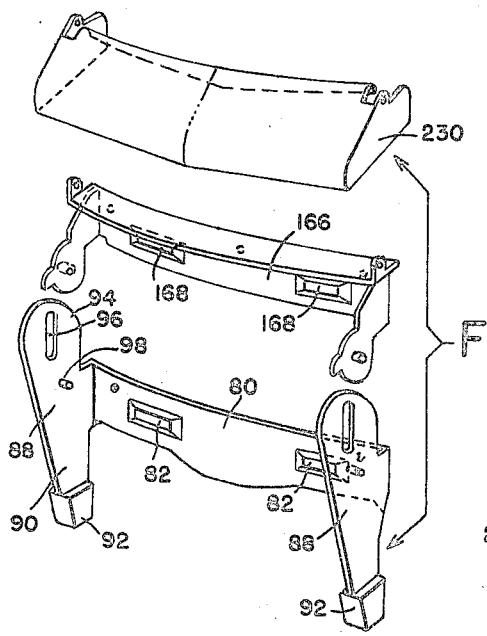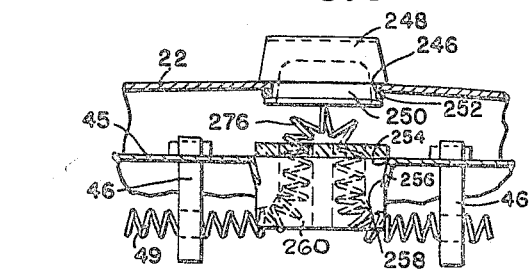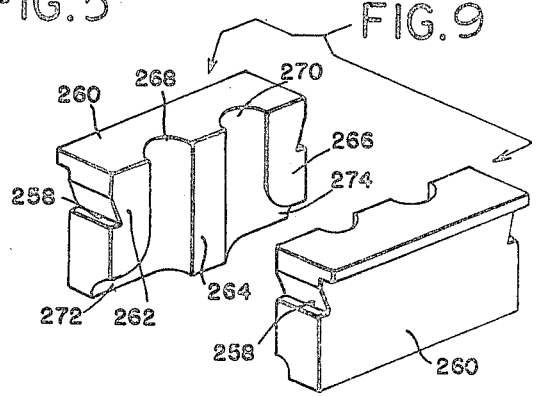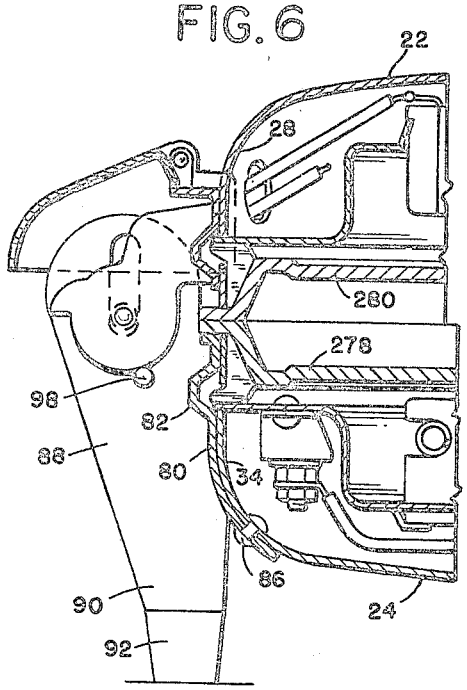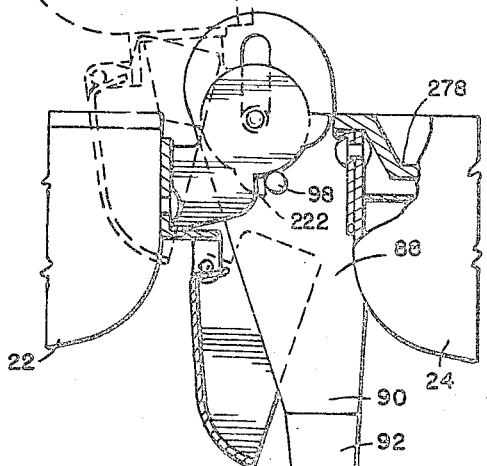

2,780,707

ELECTRIC COOKING APPLIANCE

Arthur V. Rand, Minneapolis, and William G. Roll, St. Paul, Minn., assignors, by mesne assignments, to Illinois McGraw Electric Co., a corporation of Illinois Original application July 5, 1952, Serial No. 297,262. Divided and this application April 12, 1954, Serial No. 423,940

6 Claims. (Cl. 219—19)

The present invention relates to electric cooking appliances and more particularly to improvements in the construction of cooking appliances of the opposed mold or grid type such as waffle irons and sandwich grills.

Cooking appliances are well known in which two casing members are provided with electrical heating elements and suitable cooking plates and are hinged together for movement between closed and open positions. In some of these devices the particular cooking plates, such as waffle grids, may be removed and replaced by another type of cooking surface, such as flat grill plates. The present invention is illustrated in connection with a cooking appliance of this type, and while certain features of the invention are related to the use of removable or interchangeable cooking plates, other features are capable of use in cooking appliances wherein the plates are permanently fixed in position.

One object of the present invention is the provision of an improved arrangement of the heating element and heating element supporting tray in the upper casing of such a device, whereby part of the heating element is utilized as a signal means to indicate the operating condition of the device.

Other objects and advantages of the present invention will be apparent from the following description, in which certain preferred embodiments of the invention are disclosed. In the drawings which form a part of this application, Figure 1 is a side elevation of a cooking appliance according to the present invention, certain portions being broken away and other portions shown in section for clearness.

Fig. 2 is a partial exploded view of the lower casing and heating element supporting tray prior to assembly.

Fig. 3 is a partial perspective view of the forward portion of the lower heating element tray in inverted position.

Fig. 4 is an exploded view showing details of the latch for the removable cooking plate.

Fig. 5 is an exploded view showing elements of the hinge assembly of the device.

Fig. 6 is a partial side view similar to Fig. 1, with portions shown in section and other portions broken away, showing an alternate form of cooking plate according to the invention, the hinge assembly being in closed position.

Fig. 7 is a view similar to Fig. 6 showing a plurality of open positions of the hinge assembly and casing.

Fig. 8 is a partial sectional view on the line 8—8 of Fig. 1, and

Fig. 9 is an exploded view showing details of the insulator of Fig. 8.

As shown in Fig. 1, the cooking appliance according to the present invention includes upper and lower body portions or casings 22 and 24, respectively. The upper body portion 22 includes a front wall 26, back wall 28, and side walls 30 providing a substantially open-mouthed casing, having its open mouth facing downwardly. Similarly the lower body portion 24 includes a front wall 32, a rear wall 34, and side walls 36 which provide a pan-shaped casing having an open mouth facing upwardly toward the upper casing. Across the open mouth of each casing a removable cooking plate is provided. For example, an upper waffle grid 38 is removably supported across the open mouth of upper casing 22, while a lower waffle grid 40 is removably mounted on the open mouth of the lower casing 24. While these cooking plates or waffle grids 38 and 40 may have any desired configuration and may be perfectly symmetrical, the lower grid 40 has been illustrated with a peripheral upwardly projecting flange 42 which provides a neat appearance at the joint between the plates.

In order to heat the respective cooking plates 38 and 40, each casing is provided with a heating element supporting tray which carries a heating element on suitable insulating members. For example, the lower casing is provided with heating element supporting tray 44 mounted within the casing below cooking plate 40, while upper casing 22 is provided with heating element tray 45 mounted above the cooking plate 38 in the position of the parts shown in Fig. 1.

The heating element itself may be mounted on the tray in any known or desired manner. For purposes of illustration, insulators 46 have been provided on lower tray 44, such insulators being inserted upwardly through a suitable hole in the tray and provided with bottom shoulders 50 which limit such upward movement. Tabs 52 formed when the insulator opening was stamped into the tray 44 are bent beneath the base and the flange 50 of the insulator 46 to prevent its downward withdrawal. The heating element is shown at 48 and is woven back and forth and supported in suitable notches in the insulating members 46. A terminal strip 54 may be supported from a portion of the tray to provide a place for suitable terminal connections for the heating element. It will be understood that the method of supporting the heating element on the upper tray is substantially the same as that described for the lower tray and that the heating units for the respective cooking plates are connected in circuit with each other in known manner.

The manner in which the element trays are supported within the casing will be described in connection with the lower tray 44. It will be understood that the upper tray is similarly supported within the upper casing 22. This lower tray 44 is provided around the periphery of the heating element supporting area with an upwardly projecting rear wall 56, an upwardly projecting front wall 58, as well as corresponding side walls. These vertical wall portions are useful in connection with certain features of the latching mechanism to be described and also serve to strengthen the construction.

At the top of the vertical walls 56 and 58, the tray 44 is provided with horizontally extending edges or flanges 60 and 62. Flange 60 is illustrated as projecting toward the rear wall 34 of the lower casing 24, while flange 62 projects toward the front wall 32 of casing 24. Thus these flanges or edges 60 and 62 of the element tray 44 are designed to engage the inner sides of the casing walls and thus serve to locate the element tray and prevent relative horizontal movement thereof within the casing 24.

To support the rear edge 60 of the tray at the desired vertical level within casing 24, the tray edge 60 is provided with projecting tongues 66 for engagement in suitable slots 70 in the rear wall 34 of casing 24. As shown particularly in Fig. 2, slot 70 has a lower portion 72, the width of which is just sufficient to accommodate the corresponding tongue 66 of rear edge 60 of element tray 44. Similarly, the depth of this lower portion of the slot is also just sufficient to accommodate the vertical thickness of tongue 66.

In this connection the portion of slot 70 just above the tongue 66 is narrower than the lower portion of the slot. This upper portion, as shown at 74, thus provides a downwardly facing shoulder 76 which engages the upper surface of tongue 66 and prevents undesired upward movement of tongue 66 and element tray 44. The bottom of the slot 70, of course, limits downward movement of the tongue and tray. The casing wall 34 is unbroken across the top of the slot as shown at 78, so that this upper portion of the slot may also serve as part of the retaining means for the removable cooking plate as described below. In the particular slot configuration shown in Fig. 2, it may be considered that the slot is in the shape of an inverted T, with the tongue 66 of the heating element tray 44 positioned and retained against undesired movement through engagement with the wider head portion of the T.

As illustrated in Fig. 1, a plate or bracket 80 is mounted on the outer surface of the rear casing wall 34 and extends across the area of the slot openings 70. At the area where the plate or bracket portion 80 lies directly across slot 70, this plate is deformed outwardly as shown at 82, thus providing an area or chamber 84 between the deformed portion 82 of plate 80 and the rear casing wall 34. This outwardly deformed area 84 thus receives the ends of the tongues 66 on the rear edge 60 of the element tray, so that such tongues may project a reasonable distance through the slot 70. By virtue of this construction the tongue 66 may be long enough to insure interlocking engagement with slot 70, while at the same time the end of the tongue 66 and the slot 70 are suitably concealed and protected, so that they will neither be visible from the rear nor will offer a projection on which materials could be caught and torn.

The present invention contemplates the additional provision of hinge and/or supporting leg portions on this bracket member 80. The bracket portion 80 is shaped to fit closely against the outer wall of the casing and may be riveted thereto as shown at 86 (Fig. 1). At each end of the bracket or plate portion 80 is provided an integral outwardly projecting vertical flange 88. Details of these flanges are described below in connection with the hinge assembly of the appliance, but it may be noted that the lower portion 90 of flange 88 is provided with insulated supporting feet 92 which space the plate 80 and attached lower casing 24 a predetermined distance above any supporting surface on which the appliance is placed. Flange 88 may also project upwardly to provide a hinge portion at 94 in which a vertical slot 96 or other hinge connection is provided. For the particular type of hinge illustrated and described in detail below, a stop pin 98 is also provided on flange 88 somewhat below and inwardly of the slot 96. Thus the central plate portion 80 of the hinge and supporting leg bracket not only joins the flanges 88 at each end thereof and provides a firm attachment for the hinge and supporting leg assembly to the casing, but also provides the deformed area 82 described above which receives the ends of the element tray tongues and conceals and protects them.

The opposite or front edge 62 of the heating element tray is also supported and retained against vertical movement. Here the front casing wall 32 is cut away as shown at 100 to accommodate part of the latch mechanism described below. This cut away portion may also include a circular notch 102 to accommodate the shaft 104 (Fig. 1) of a suitable control thermostat 106. This thermostat 106 is mounted in known manner in such a way that it has a heat-conductive portion 108 at its top in close thermal relationship with the under surface of the cooking plate 40. Thus the thermostat is closely responsive to the temperature of the cooking plate and is connected in circuit with the heating element to control the energization of the latter and maintain the desired cooking plate temperature. A control knob 110 at the outer end of the shaft 104 permits manual adjustment of this cooking temperature.

A bracket member 116 is designed to be mounted on the outside of this casing wall 32.

While the bracket 116 may be used for various purposes, it is illustrated in connection with the lower casing as a mounting means for a front control panel. Thus the bracket 116 has a circular opening 130 through which the thermostat adjusting shaft 104 may project to the front of the casing. An insulating panel 132, which serves as a control panel and may carry suitable indicia cooperating with the thermostat adjustment knob 110, is suitably connected to the front of bracket 116.

As illustrated in Fig. 1, the means for retaining the upper element tray 45 is substantially similar to that just described. Here, however, the bracket 146 at the front wall 26 of the upper casing 22 is in the form of a spacer for the upper casing handle. This bracket 146 has side flanges 148 each of which has upper and lower tabs 150 and 152 projecting through suitable slots in the casing above and below the front edge of the element tray 45. These tabs may be deformed to hold the handle spacer or bracket 146 in position. A screw 154 is additionally provided and extends from the inside of the casing 22 up through the bracket 146 and into a plastic handle member 156. This handle has its upper portion 158 projecting upwardly above the appliance to serve as a support for the upper casing when the latter is opened 180 degrees to the heavy-line position illustrated in Fig. 7. The lower edge 160 of this handle member 156 is located at a point which will be spaced somewhat above the upper edge 138 of the control panel 132 on the lower casing. This spacing is designed to be just sufficient to accommodate the fingerpieces of the latch members described below. For convenience in appearance and design, the lower edge 160 of the upper handle 156, and the upper edge 138 of the control panel 132, as well as the intervening latch fingerpieces are preferably identical in width.

The opposite or rear end of the upper element tray 45 is secured in the same manner as the rear edge 60 of the lower element tray by means of tongues 162 which project through slots 164 in the rear upper casing wall 28. The plate or bracket 166 overlies the rear casing wall throughout this area and is deformed at 168 to receive and protect the projecting tongues 162. This bracket portion 166 may constitute part of the upper hinge member.

As now will be described, latching means is provided for the removable cooking plates. With reference to the lower waffle grid 40, at least one outwardly extending projection or shoulder 170 is provided at one edge of the grid for insertion in a slot in the casing wall. As shown in Fig. 1, this shoulder 170 is preferably located at the rear edge of the cooking plate 40 and is designed for engagement in the narrower but deeper upper portion 74 of the slot 70 in the rear casing wall 34. Thus the same slot 70 which has a wide lower portion to retain the tongue of the heating element tray may also serve as the retaining means for the projection 170 on the cooking plate. Since the wall portion 34 is continuous across the top of the slot as shown at 78, this engagement of the casing wall above the slot with the upper surface of projection 170 will prevent inadvertent upward movement of the rear edge of cooking plate 40.

The latching means also includes means at the opposite edge of the cooking plate providing an outwardly and upwardly facing shoulder 174. Here the shoulder 174 is provided by a depending lug 172. This latching shoulder 174 is engaged by the latching portion 176 of a latch member shown generally at 178 (Figs. 1, 3, and 4).

Beyond the latching portion 176, the main body of latch 178 extends upwardly and outwardly through the notched portion 100 of the front casing wall 32 and the notched portion 142 of bracket 116 to a position outside the casing and adjacent the front edge of the cooking plate 40. This outer portion of the latch has a vertical section at 198 to maintain the latch close to the edge of the cooking plate, and the extreme outer portion of the latch is then formed in a horizontal fingerpiece 200. Fingerpiece 200 is wider than the remainder of the latch and is designed to be of the same width as the upper edge 138 of the control panel 132. This fingerpiece includes vertical front and rear flanges 204 and 202 which give the fingerpiece a channeled shape for rigidity.

The front flange 204 also assists in concealing the space between the fingerpiece 200 and the upper edge 138 of the control panel in the latching position shown in Fig. 1.

Because of the relative location of the latching shoulder 174 and the pivot and fingerpiece of the latch itself, the fingerpiece 200 and latching portion 176 of latch 178 will move both downwardly and outwardly in response to pressure on fingerpiece 200. This downward and outward movement will move the latching portion 176 clear of the shoulder 174 to permit upward removal of the front edge of lower cooking grid 40. Once the front edge of the grid is lifted, the projection 170 at the rear of the grid can be disengaged readily from the slot 70.

The waffle grid or some other form of cooking plate such as the flat grill plate 278 of Fig. 6, can then be reapplied to the lower casing by reversing the operation. Thus the mounting of the grid will involve, first, the engagement of the rear projection 170 with the upper portion of slot 70. The front of the plate will then be pushed downwardly and by virtue of the curved surfaces on the latching portion 176 and shoulder 174, the shoulder will snap past the latch until the spring brings the latching portion in above the shoulder and retains the plate in position.

The latching and retaining means for the upper cooking plate is substantially similar in construction. Thus the upper grid 38 has at its rear edge a rearwardly extending projection 206 for engagement in the slot 164 in rear casing wall 28. At the front edge of the upper grid 38 a forwardly facing latching shoulder 208 is provided. This latching shoulder is engaged by the latching portion of an upper latch member 210 mounted on upper element tray 45 and having a fingerpiece 212 located just below the lower edge 160 of the upper casing handle 156.

The improved hinge assembly which permits movement of the upper and lower casings from the relatively closed position of Fig. 1 (in which the cooking plates are in face-to-face position opposite each other and the casings are relatively superimposed) to an open position (in which the plates are spaced from each other) has already been partially described. The hinge details are further shown in Figs. 5, 6 and 7.

According to the present invention an improved signal light arrangement is provided to show the operating condition of the device. As illustrated in Figs. 1, 8 and 9, the upper casing 22 is provided with a signal light opening 246. Mounted in this opening is a suitable signal light lens member 248 having a reduced portion 250 extending down through the opening and shouldered at its lower end to engage a snap-retaining ring 252 on the inner side of the casing wall. Directly beneath the signal light opening in the casing 22 is a corresponding opening 254 in the upper element tray 45. An insulator is mounted in this opening and part of the upper heating element is threaded up over the insulator so as to be visible through lens 248.

In the specific example shown, integral tabs are struck downwardly from the tray as shown at 256 for engagement in notches 258 in insulating members 260. The complete insulating member is made in two identical halves having surfaces 262, 264, and 266 in a common central plane for engagement with each other. One or more vertical passages 268 and 270 are provided, half of the passage being located in each insulator. The lower ends of the passages may be rounded as shown at 272 and 274.

The heating element 49 for the upper casing is supported on depending insulators 46 carried by element tray 45, these insulators being identical to those previously described in connection with the lower casing. A portion of this upper heating element wire 49 is looped upwardly through one passage 268 and back down through the adjacent passage 270 of insulating members 260. Thus a bight 276 of the upper heating element wire 49 lies above the element tray 45 directly beneath the signal light opening in upper casing 22. When the heating element is energized, it will act as a direct signal which can be observed through the lens 248 to indicate the operating condition of the appliance. Thus a particularly economical and advantageous construction has been provided for utilizing the heating element wire as an operating signal for the device.

Some of the features shown, but not claimed, in the present application are more fully described and claimed in applicants' prior copending application Serial No. 297,262, filed July 5, 1952, of which this application is a division.

The construction described above substantially accomplishes the objects set forth at the beginning of this application and offers definite advantages in economy and simplification of construction, as well as ease of operation. Since minor variations and changes in the exact details of construction will be apparent to persons skilled in this field, it is intended that this invention shall cover all such changes and modifications as fall within the spirit and scope of the attached claims.

Now, therefore, we claim:

1. An electric cooking appliance having an upper casing with a signal light opening therein, a heating element supporting tray mounted in the casing and having depending insulating members underneath the tray, said tray also having an opening beneath the signal light opening of the casing, a heating element carried beneath the tray by said depending insulating members, and an insulator in said tray opening, an intermediate looped portion of said heating element extending from beneath the tray up over the insulator to a point above the tray in proximity to said signal light opening where said element is visible through said signal light opening and back down through said opening over the insulator.

2. An electric cooking appliance having an upper casing with a signal light opening therein, a heating element supporting tray mounted in the casing and having depending insulating members underneath the tray, said tray also having opening means beneath the signal light opening of the casing, a heating element carried beneath the tray by said depending insulating members, and insulator means in said tray opening having passages from one side of the tray to the other, an intermediate looped portion of said heating element extending from beneath the tray in proximity to said signal light opening up through one of the insulator means passages to a point above the tray where said element is visible through said signal light opening and back down through the other of said passages.

3. An electric cooking appliance having an upper casing with a signal light opening therein, a heating element supporting tray mounted in the casing and having insulating members positioned beneath the tray, said tray also having an opening adjacent the signal light opening of the casing, a heating element carried beneath the tray by said insulating members, and an insulator in said tray opening having a pair of passages from one side of the tray to the other, a looped portion of said heating element extending from beneath the tray up through one insulator passage and down through the other and being positioned in proximity to said signal light opening where said looped portion of said element is visible through said signal light opening.

4. An electric cooking appliance as set forth in claim 3, wherein the insulator is split through the two passages for facilitating insertion of the looped portion of the heating element, said insulator being held together by a mounting in the opening in said tray.

5. An electric cooking appliance as set forth in claim 4, wherein the insulator comprises two identical halves each having a pair of substantially semi-circular grooves, the substantially semi-circular grooves of opposite halves cooperating to form said passages.

6. An electric cooking appliance having an upper casing with a signal light opening therein, a signal lens element mounted in said signal light opening, a heating element supporting tray mounted in the casing and having insulating members positioned beneath the tray, said tray also having an opening positioned adjacent the signal light opening of the casing, a heating element carried beneath the tray by said insulating members, and an insulator in said tray opening having passages from one side of the tray to the other, a portion of said heating element extending from beneath the tray up through one insulator passage to a point above the tray in proximity to said signal light opening and said signal lens element where said heating element is visible through said signal lens element and back down through the other insulator passage.

References Cited in the file of this patent

UNITED STATES PATENTS

| 1,280,709 | Glass | Oct. 8, 1918 |
| 1,971,971 | Walder | Aug. 28, 1934 |
| 2,006,509 | Myers | July 2, 1935 |
| 2,012,943 | Arnold et al. | Sept. 3, 1935 |
| 2,099,152 | Walder | Nov. 16, 1937 |
| 2,180,927 | Johnson | Nov. 21, 1939 |
| 2,354,240 | Young et al. | July 25, 1944 |